United States Patent [19]

Pouey

[11] 4,036,558

[45] July 19, 1977

[54] FOCALIZATION PROCESS OF SPHERICAL CONCAVE DIFFRACTION GRATINGS

[75] Inventor: Michel Pouey, Vanves, France

[73] Assignee: Etablissement Public: Agence Nationale de Valorisation de Recherche (ANVAR), Neuilly sur Seine, France

[21] Appl. No.: 537,460

[22] Filed: Dec. 30, 1974

Related U.S. Application Data

[63] Continuation-in-part of Ser. No. 277,857, Aug. 4, 1972, abandoned.

[30] Foreign Application Priority Data

Apr. 21, 1972 France .................................. 72.14214

[51] Int. Cl.² .............................. G01J 3/40; G01J 3/12
[52] U.S. Cl. ..................................... 356/79; 250/226; 356/100; 356/101
[58] Field of Search ............... 350/162 R; 356/79, 99, 356/100, 101; 250/226

[56] References Cited

U.S. PATENT DOCUMENTS

| | | | |
|---|---|---|---|
| 2,750,836 | 6/1956 | Fastie | 356/100 |
| 3,090,863 | 5/1963 | McPherson | 356/100 |
| 3,418,051 | 12/1968 | Staunton | 356/101 |
| 3,628,849 | 12/1971 | Flamand et al. | 350/162 R |
| 3,730,626 | 5/1973 | Cruvellier et al. | 356/101 |

OTHER PUBLICATIONS

"Monochromateur Pour la Region 400A–3000A;" Pouey et al.; Revue d'Optique, Sept. 1965, pp. 446–458.
"Design...Monochromators", M. Pouey, Optics Communications vol. 3, No. 4, June 1971, pp. 201–204.

Primary Examiner—Vincent P. McGraw
Attorney, Agent, or Firm—Baldwin, Wight & Brown

[57] ABSTRACT

The invention provides a focalization process of spherical concave diffraction gratings, working by reflection for the dispersion of various radiations constituting a polychromatic light, in which fixed entrance and exit slits are used and in which only a certain rotation is imparted to the grating, the rotation is imparted to the grating in such a way as to make the radiations move in the exit slit. For a certain ruled width of a given grating and a given resolution, the sum of the object and image tangential focal length equations has a value $\epsilon$ different from zero and determined in function of the aberrations furnished by a concave grating corresponding to the retangular port.

16 Claims, 24 Drawing Figures $\alpha = -\gamma + \theta$
$\beta = -\gamma - \theta$ $\alpha = -\gamma - \theta$
$\beta = -\gamma + \theta$ $\alpha = \gamma + \theta$
$\beta = \gamma - \theta$ $\alpha = \gamma - \theta$
$\beta = \gamma + \theta$ $\alpha = \gamma + \theta$
$\beta = -\gamma - \theta$ $\alpha = -\gamma - \theta$
$\beta = -\gamma + \theta$ $\alpha = \gamma + \theta$
$\beta = \gamma - \theta$ $\alpha = \gamma - \theta$
$\beta = \gamma + \theta$ R=400.7mm  N=1221,2 tr/mm
2θ=144° 52' 30"
h'=4mm
fi = 10 μ

R=500mm  N=1221,2 tr/mm
2θ = 28°
h'= 4 mm
fi = 10 μ

FOCALIZATION PROCESS OF SPHERICAL CONCAVE DIFFRACTION GRATINGS

CROSS REFERENCE TO RELATED APPLICATION

This is a continuation-in-part of Ser. No. 277,857 filed Aug. 4, 1972, now abandoned.

The invention concerns the focalization by rotation of concave grating; it concerns also the application of this focalization, particularly to monochromators.

The operation of a concave spherical diffraction grating, working by dispersion of the different radiations constituting a polychromatic light, is well known. The images from source S (FIG. 1), located at a distance $r$ and diffracted in different directions $\beta i$ are focalized at distances $r'$ from the diffraction grating top; which are function of the wave length $\lambda i$. In FIG. 1, the plane tangent to the top of the grating, characterized by its radius of curvature R, its number N of lines per millimeter, its width W, its ruled height L, is vertical and the lines direction represents the vertical of the locus. The rotation axis of the grating is an axis parallel to the vertical of the locus, passing through its top. It is known that a monochromator permitting the selection of a given wavelength may be achieved by arranging in S a slit parallel to the grating lines, called entrance slit, and by placing in S' a slit parallel to the direction of the tangential astigmatic focal lengths, called exit slit. In general, the middle of the entrance slit is in the horizontal plane containing the line normal to the grating and the slit is then parallel to the lines of the grating. A focalizing mechanism generally ensures:

either the displacement of a receiver; in that case, the exit beam direction variations are large, or the simultaneous rotation and translation of the grating, which also engender exit beam direction variations, particularly large in the case of gratings with small radius of curvature, generally presenting an interst opening.

It has been recognized that, for a monochromator to be suitably usable, a certain fixity of the respective directions of the incident and emergent beams is necessary. In addition, if, for cost price reasons only a simple grating rotation is effected, the classical theory shows that only an exit slit displacement permits to obtain good focalization. In that case, the severe tolerances of grating displacement are replaced by those of the displacement of one of the slits.

Amidst research performed on concave grating focalization, that by SEYA has shown that, with a 70°30' value of the angle $2\theta$ under which, the two slits are seen from the top of the grating, one obtains a stationary solution for the values $r$ and $r'$ equal to R cos $\theta$. The corresponding assembly (FIG. 2), while meeting the aforegiven mechanical conditions does not offer satisfactory optical qualities. In fact, it has small resolution and small brightness and, since the angles of incidence $\alpha$ and of diffraction $\beta$ are high, it has, in addition, a high rate of polarization and high astigmatism. This result, which the theoretical computations of NAMIOKA have confirmed, shows therefore that if a concave grating could be focalized by only imparting a rotation to that grating, this possibility was imperfect and as numerous tests have shown, linked to a precise value of the angle $\theta$. Any modification of the above value of $2\theta$ generally leads to a large lowering of resolution, which has been tolerated by certain authors for own reasons.

For low values of $2\theta$ a certain improvement of image quality has been obtained at the price of a displacement of the exit slit in direction of the grating, the amplitude of this displacement being then function of the wavelength value. In known mountings, no account is taken of the aberrations and one neglects therefore the important fact that a judicious choice of the sphere of reference, i.e. of the exit slit position, may result in a compensation of these aberrations and, consequently, in an increase of the tolerable ruled area.

The search for a general solution that is as simple as possible was therefore desired, considering the many practical industrial applications possible for focalizing a concave spherical grating. In the case of such a grating. Fermat's principle, which translates the fact that the total optical path P should be stationary with respect to $w$, where $w$ and $l$ are the rectangular coordinates respectively perpendicular and parallel to the rulings permits to determine the conditions under which $\delta p/\delta \omega = 0$ and which are expressed essentially by the sum of two functions $S_1$ and $S_2$ such that $S_1 + S_1 = 0$. Generally, $S_1 = 0$ is realized, which is the same as writing that the fundamental focalization equation is $T + T' = 0$, $T$ and $T'$, representing respectively the equation of one object tangential focal length. The term $S_2$, characterizing the aberrations, is then minimized. The inventor has thought firstly that, for a suitably chosen reference sphere, the term $S_2$ might be written $$S_2 = C_1 w + \tfrac{1}{2} C_2 W^2 + S_3$$

$C_1 w$ and $C_2 w^2$ characterizing a displacement of the reference sphere and $S_3$ being lower than $S_2$. The inventor then had the idea, which lies at the basis of the invention, to write the fundamental focalization equation in the form of:

$$T + T' = \epsilon$$

linked to $C_1$ and $C_2$, $\epsilon$ being set in function of the tolerances on the image aberrations of a given line by a rectangular pupil concave grating. In other words, the inventor has expressed a focalization law taking the aberrations into account. This has enabled him to obtain good focalization by simple rotation of the grating and with fine slits; the original equation $T + T' = 0$ (equation of the first order) could not have achieved this result.

In its most general form, the invention concerns, therefore, a focalization process of spherical concave diffraction gratings, working by reflection for dispersion of the different radiations constituting a polychromatic light, in which fixed entrance and exit slits are used and in which only a certain rotation is imparted to the grating, said process being characterized by the fact that the rotation is imparted to the grating in such a way as to make the radiations move into the slit plane and that, for a given wavelength in a given direction, for a certain ruled width of a given wavelength in a given resolution, the sum of the equations of the object and image tangential focal lengths has a value other than zero, which is determined in function of the aberrations supplied by a concave grating corresponding to the rectangular pupil. Said focalization process may be utilized through an optical mounting characterized by the fact that the optical parameters are such that the image distance variations linked to the first order equation $T + T' = 0$ are compensated by the lack of development which should be provided in compensation of the aberrations (term of the second order).

By his proposal, the inventor has therefore assumed, what computations and experimentation have confirmed, that this expression of the focalization problem would facilitate very markedly the field of practical applications of focalization of concave gratings, among others increasing the resolution and brightness while decreasing the cost price of spectrometers, more and more used in industry and in laboratories, in particular when these instruments are designed to deliver monochromatic radiations in a strictly fixed direction, the incident beam being also fixed (monochromator).

Within the context of the new form of the general focalization equation are developed hereafter the different conditions which must, as much as possible, be realized to achieve the result desired.

a. it is well known that any spectrometer may be characterized by its practical resolving power and by its brightness.

The theoretical resolving power given by the diffraction equals KNW, where K is the order of diffraction and W the ruled width. In fact, this resolving power is limited since, when W increases, the aberrations increase and a tolerance linked to image spot modifications must be determined. The optimum resolving power than equals $KNW_o$ where $W_o$ is the optimum ruled width (i.e. in terms of the rectangular coordinate W, w varies from $-W_o/2$ to $+W_o/2$). In this way one also determines in general a practical resolving power $R_p$ depending on the width $f$ or $f'$ of the slits used and which is expressed by $R_p = (r' KN \lambda)(f\cos \beta)$. In the case of small aberrations, the limited practical resolving power is given by $R_p = 0.8 K NW_o$, the value $W_o$ of W being computed on the basis of STREHI's criterion. Under the geometric assumption (large aberrations), a quality factor gives, for each value of the couple, W, l, a limiting resolution $<\delta\lambda>$ and therefore the practical limiting resolving power $R_p = \lambda/<\delta\rightarrow>$, where $\lambda$ is wavelength.

The brightness L equals the exciting flux for a luminance unit source placed in the entrance slit plane. Brightness and resolution are not two independent quantities. In fact, the product $L R_p$ is proportional to $NW_oL_o/R$ where $L_o$ is the optimum ruled height, (i.e. the rectangular coordinate l varies from $-L_o/2$ to $+L_o/2$) since the brightness L is proportional to $W_oL_o/R$ N $<\delta\lambda>$ b. it is known that, for solving the equation $T + T' = 0$, one may either use special mathematical solutions, which correspond to the known mechanical solution of Rowland's Circle or of Wadsworth's mounting, or admit that the said equation and its three partial derivatives are approximately zero, which corresponds to the Seya-Namioka mounting. In the second case, the authors have shown that there exists a single possible value (70°30') for the angle 2θ, under which both slits are seen from the grating top, and for which the object and image distances are equal to R cos θ.

c. Concerning the aberrations, a computation permits linking the image spot broadening (and therefore the resolution loss) in function of aberrations amplitude. This computation is done by the intermediary of STREHL's criterion or through the study of a quality factor characterizing the trace of light rays located in the image plane, weighted by intensity distribution. In general, one uses only the quality factor Q as defined by (1):

$$\frac{1}{WL} \int_{-\frac{L}{2}}^{\frac{L}{2}} \int_{-\frac{W}{2}}^{\frac{W}{2}} \left( \frac{\delta\Delta'}{\delta\omega} + \frac{\delta\Delta'}{\delta l} \right)^2 d\omega \, dl \leq \frac{K^2N^2 <\delta\lambda>}{\cos^2 \beta} = Q^2$$

If $\Delta(\omega\% L)$ characterizes the aberrant optical path and if $C_1w$ and $C_2w^2$ characterize a displacement of the reference sphere, $\Delta'(\omega l)$ is given by $$\Delta'(w,l) = \Delta(w,l) + C_1w + C_2w^2$$

The minimization of the first term of equation 1 gives the values of $C_1$ and $C_2$ in function of the aberrant coefficients. Q is deduced from them and, consequently, the luminosity L.

d. The FIGS. 3 (3a through 3d) which represent various asymmetrical focalization mountings with simple rotation of the concave grating, give the values of angles α and β of incidence and diffraction respectively. Making the image distance stationary for a given spectral field is the same as writing that the variations obtained by the "first order equation" equal those which should be effected to compensate the aberrations. According to the invention, this last variation is deduced from the preceding quality factor, which also expresses the fact that, if the reference sphere is displaced with respect to the initial conditions of said first order equation, the aberrations are compensated. Therefore, the generalized focalization equation $(T + T' = \epsilon)$ is then satisfied, the aberrant terms in this case being equivalent to $C_1w + C_2w^2$. Under these conditions, the fundamental focalization equation of a simple rotation mounting is expressed by equation (2):

$$\frac{\cos^2 \alpha}{\beta} + \frac{\cos^2 \beta}{e'} = \cos \alpha + \cos \beta +$$

$$\frac{R W_o^2}{2} \left[ \frac{6}{5} (C_4 + C_{04}) + \frac{1}{3} (C_{22} + 2C_4)\rho^2 \right]$$

if $C_{04}$, $C_4C_{22}$ are aberration coefficients of the fourth order and if $\rho = L_o/W_o$. In the first order equation, the second term would be equal to $\cos \alpha + \cos\beta$. That is to say, for $T + T' = \cos^2\alpha/e + \cos^2\beta/e' - (\cos\alpha + \cos\beta) = 0$ (first order equation) the last term on the right of equation (2) is not taken into consideration.

For each value of the wavelength $\lambda$ i.e. of $\delta$ or of α and β the aberration coefficients may be computed for a given value $e_1$ and $e_l$ of e and e'.

To each value of W and ρ corresponds a value of $<\delta\lambda>$ so that (equation 3):

$$\frac{W_o^6}{175} (C_{04} + C_4)^2 + \frac{(C_{22} + 2C_4)^2\rho^2}{240} + \frac{1}{60} \left[ C_4(C_{22} + 2C_4) + \frac{1}{9} (C_{22} + 2C_4)^2 \right] \rho^4 +$$

$$\frac{C_{03}^2 \rho^6}{8} + \frac{C_{21}^2}{20} W_o^4 \leq \frac{K^2 N^2 <\delta\lambda>^2}{\cos^2 \beta} = Q^2$$

if $C_{03}$ is an aberrant coefficient of the third order. The two equations (2) and (3) therefore permit to determine all the optical parameters characterizing a given mounting.

On the basis of these results, establishing the merits of the proposal serving as the basis for the invention, the practical development of the corresponding process should permit to obtain, in a given direction, a passband $\Delta\lambda$ as narrow as possible, the direction of the incident beam and the slit position being fixed. In particular, the condition (2) must be satisfied. It may be put in the form of:

$$\frac{\cos^2 \alpha}{e} + \frac{\cos^2 \beta}{e'} = H(\lambda) \tag{4}$$

In the general case, the solution of this equation is feasible by successive iterations, since $H(\lambda)$ depends on the value of parameters $e$ and $e'$. For each value $e_n$ and $e'_n$ of $e$ and $e'$, one can compute the coefficients $C_{ij}$ and, consequently, $<\delta\lambda>$ and $H_n(\lambda)$. It should be then checked whether $e'n'$, determined by the relation:

$$e'_n(\lambda) = \cos^2 \beta \left[ H_n(\lambda) - \frac{\cos^2 \alpha}{e_n} \right]^{-1} \tag{5}$$

is equal to the value $e'_n$ chosen for computing $H_n(\lambda)$. In the contrary case, this would signify that the $e'_n$ value chosen i.e. the position of the exit slit is not valid for all the wavelengths of the spectral range in question. If $e'_n(\lambda)$ is very different from $e'_n$, the iteration process must be continued, taking as new approximate values of $e$ and $e'$ the values deduced from equation (5) for two particular values $\lambda i$ and $\lambda f$.

$$e_{n+1} =$$

$$\left[ \cos^2 \alpha F - \cos^2 \alpha i \frac{\cos^2 \beta F}{\cos^2 \beta i} \right] \left[ H_n(\lambda F) - H_n(\lambda i) \frac{\cos^2 \beta F}{\cos^2 \beta i} \right]^{-1}$$

$$e'_{n+1} =$$

$$\left[ \cos^2 \beta F - \cos^2 \beta i \frac{\cos^2 \alpha F}{\cos^2 \alpha i} \right] \left[ H_n(\lambda F) - H_n(\lambda i) \frac{\cos^2 \alpha F}{\cos^2 \alpha i} \right]^{-1}$$

At this point, it will be noted that an initial value to assume for $e$ and $e'$ is the value $e_o = e'_o = \cos\theta$ given by the classical theory $(T + T' = 0)$ and to make the computation for $2\theta = 70°30'$ before starting computing other values of $\theta$.

When the difference $e_p - e_{p-1}$ and $e'_p - e_{p-1}$ are less than $5.10^{-7}$, the aberrations, and therefore the function $H_n(\lambda)$ are computed for the final real value of object and image distances. Therefore, to the residual deviation $\Delta e' = e'_p - e'_p(\lambda)$ is going to correspond to defect of residual instrumental setting (the abbreviation "inst" used indicating that it is the matter of an instrumental value):

$$\delta\lambda_{inst} = \left( \frac{\Delta e'}{e'p^2} \right) \frac{W_o \cos^2 \beta}{RNK} \tag{7}$$

At the object distance $r = Rep$ and at the image distance $r' = Re'_p$, and for a given ruled surface, one obtains the limiting resolution which will be reached if the image is formed at distance $e'_p$ for all wavelengths. Since, generally, $\delta\lambda$ inst is not zero, it is necessary to determine a limit for this value. According to the invention, one may consider, in determining these limits, that everything takes place as if a non-aberrant image was being focalized at a distance $r'(\lambda) = Re'_p(\lambda)$, the exit slit being located at the distance $r' = Re'_p$. In other words, $\delta\lambda$ inst is equivalent to a simple setting defect. Now, it has been seen above that according to the previously defined quality factor, the tolerable setting point should remain less than a test quantity t, so that $$\delta\lambda_{inst} \leq t = \frac{2\sqrt{3} <\delta\lambda>}{\cos \beta} \tag{8}$$

For a given value and for each value of the couple W, L one may therefore determine, by using an electronic computer, for instance, the values $e_p$ and $e'_p$ by iteration, thus obtaining:

the practical limiting resolving power $$R_p = \frac{\lambda}{<\delta\lambda>}$$

the "instrumental defocusing" power $$\bar{p} = \frac{\lambda}{\delta\lambda_{inst}}$$

the corresponding limiting value $$\frac{\lambda}{t} = \frac{\cos \beta}{2\sqrt{3}} R_p,$$

where $t$ is the tolerated depth of focus of classical optical instruments.

If the values of $e_p$ and $e'_p$ are positive (the object and image distances corresponding to real objects and images in the case of a mounting including only a single concave grating) and if the condition $$\bar{p} \geq \frac{\cos \beta}{2\sqrt{3}} R_p$$

is satisfied within a given spectral interval, the focalization process by simple grating rotation and with fixed slits may be used for making monochromators.

If we take STREHL's criterion for fixing the characteristics which the mounting must satisfy, $H(\lambda)$ takes the value:

$$H(\lambda) = \cos \alpha + \cos \beta + \tag{10}$$

$$\frac{R W_o^2}{2} \left[ \frac{6}{7} (C_4 + C_{04}) + \frac{1}{3} (C_{22} + 2C_4) \rho^2 \right]$$

the value of $W_o$ and of $\rho = L_o/w_o$ being computed on the basis of the equation (11):

$$A\ W_0^4 + B\ W_0^6 \leq \left(\frac{\lambda}{\pi}\right)^2$$

with $$A = \frac{C_4^2}{2205} + \frac{(C_{22} + 2C_4)^2}{1620}\ \rho^2\ ;\ B = \frac{C_{03}^2}{140} \quad (11)$$

deduced from STREHL's criterion. In that case, the value of $W_o$ and $L_o$ is not chosen at departure but is determined on the basis for values of $e_p$ and $e'_p$ and on the condition (11). The practical limiting resolving power then equals $R_p = 0.8 N W_o K$ and $\bar{p}$ must satisfy the condition $$\bar{p} \geq \frac{K N W_o}{1.92} = \frac{R_p}{1.54} \quad (12)$$

The second term of the inequality being, for a given mounting, independent of $\lambda$. In this case deduced from STREHL's criterion (low phase errors) the following must be satisfied:

$$\delta\lambda_{inst} \leq 1.54\ \delta\lambda_t$$

One or another of the mountings of FIGS. 3a through 3d is chosen for a given angle $\theta$ which is done in function of the concrete cases encountered. In making this choice, one must make certain, for each case whether the brightness (i.e. the value of the ruled surface in particular) is sufficient with respect to the resolution $R_p$ demanded. As a matter of fact, at the limit, by taking very small values for W and L, the condition (8) can be always satisfied but, in fact, the corresponding instruments would then have no practical interest since their brightness as well would be very small, which is redhibitory, particularly in the far-away ultraviolet spectral range where the source energies are generally low with respect to those which may be obtained in the other spectral ranges.

In a special development of the invention for producing single or double monochromators, the latter are characterized by the use of concave spherical diffraction gratings working so-called "in plano" setting, i.e. for which the entrance and exit slit middles are in a plane containing the normal line to the grating and perpendicular to the direction of the latter's lines and in that the entrance and exit slits have a fixed width (i.e. independent of the wavelength $\lambda$), determined so that there is no flux loss at the exit slit level.

According to a preferred variant, account is taken for choosing the image plane not only the aberrations of the concave grating used, but also of the aberrations resulting from the lighting condition of said grating.

It should first be recalled and noted that the usable concave gratings may either be those ruled on glass (or copies of such gratings) or, more generally, optical components ensuring simultaneously focalization and diffraction of an incident wave regardless of the process used for this diffraction provided that, if d is the grating pitch, constant over the whole part of the optical component, the fundamental relation of this mounting be of the type:

$$\sin\alpha + \sin\beta = + K N \lambda \quad (13)$$

In this expression $\alpha$ and $\beta$ are the incidence and diffraction angles evaluated on the basis of the line normal to the grating, $N = 1/d$ is the number of lines per mm., K is the diffraction order and $\lambda$ is the wavelength the negative sign being valid for all the diffracted rays located in the image space, between the central spot $(\alpha = -\beta)$ and the tangent to the grating.

In particular, these, focalization processes apply to holographic gratings of the I type, for which the grating lines are obtained by a holographic process and for which, like in the case of classical ruled gratings, the first order focalization equation is characterized by the relation $T + T' = 0$, $T$ and $T'$ representing, as indicated above respectively the equation of the object tangential focal length and that of the image tangential focal length.

This is why, in the corresponding description we have referred only to the use of spherical concave gratings, of which the optical characteristics are equivalent to those of the usual gratings, the lines of which are defined by the intersection of the surface of a concave mirror with parallel mutually equidistant planes.

It has been seen previously that, if the aberrations are taken into account (i.e. terms of higher order in the equations derived from Fermat's principle), and a possiblity to compensate the latter by a displacement of the reference sphere, i.e. by a suitable choise of the image distance, one may produce monochromators for which the object and image distances are fixed for a high spectral interval by imparting to the grating only a rotation about an axis passing through its summit. It has also been said that such mounting have a low cost price since there is not grating translation. They also have another advantage, important for the users, viz. that the direction of both incident and diffracted beams is strictly fixed. It has also been seen that, contrary to the solution proposed by SEYA, then NAMIOKA, and limited for the ultra-violet range to a single angle close to 70°30′, the present invention permits production of mounting with any value of 2λ. The object and image distances are then given by a generalized focalization equation of the form of equation 4

$$\cos^2\alpha/e + \cos^2\beta/e' = H(\lambda)$$

in which terms of higher order are used and which, therefore, depends on the value of the stripped width W and of ruled height H (or of the ratio $\rho = H/W$). It should be added that other values of the 2λ of SEYA and NAMIOKA have been considered but that they were linked to considerable resolution lowering (or that of brightness) if the image distance remained fixed. They also involved any additional mechanical complication if the value or r′ was adjusted experimentally in function of the wavelength.

Thus, as has been stated previously, the result is that, to each ruled surface is associated a limiting resolution which can only be obtained on the basis of slits of given $f$ and $f'$. It has been noted experimentally that, because of the low luminance of the sources used at present in the near and far-away ultraviolet range and because of the small effectiveness of the gratings available commercially at present, it was difficult to use slits of widths $f$ and $f'$ because of the low value of the noise-signal ratio obtained at the output. One is therefore led, particularly in case of industrial controls, to use wide slits of non-negligible height since the outgoing flux is directly proportional to the area of the exit slit. Finally, it is very interesting for the user of a commercial instrument not to have to vary the slit width manually in function of the wavelength. It is certain that necessarily complicated automatic mechanisms may be designed to effect such width variations, but whether manual or automatic, the adjustment of slit dimensions necessarily increases the complexity and the price of the instruments.

Using the phase aberration correction process according to the invention, the aberrant optical path $\Delta'(w_1,l)$ taking into account a displacement of the reference sphere with respect to the position foreseen by the first order theory, has been taken into consideration. If we use slits of non-negligible heights and very open mountings, i.e. for high values of ratios $H/r'$ and $W/r'$ and if $(h^2-2h'L_o) R^3$ is higher than $\lambda/Wo^2$, $\Delta'(w,l)$ is expressed by:

$$\Delta'(w,l) = \Delta'_1(w,l) = C_1 w + C_{o1}w + \Delta'_2(w,l) + C_2w^2 + C_{o2}w^2$$

with $$\Delta'_1(w_1,l) = \sum_{ij} C_{ij}l^iw^j \simeq C_{03}w^3 + C_{21}l^2w \quad (1)$$

where $C_{ij}$ characterizes the aberrant coefficients with $i = 0,2; i + j = 3,5$ where $C_1w$ characterizes the tilting of the reference sphere where $C_{o1} w$ is a term which is a function of the height $h'$ of the exit slit and with $$\Delta'_2(w_1,l) = \sum_{ij} C_{ij}l^iw^j \simeq C_{22}w^2l^2 + C_{04} w^4 + C_4(w^2 + l^2) \quad (2)$$

if $i = 0,2$ and $i + j = 4,6$
if $C_2w^2$ characterizes the displacement of the reference sphere
if $C_{o2}w^2$ is a term which is a function of the height $h'$ of the exit slit.

As previousluy indicated, the coefficients $C_1$ and $C_2$ are determined by a geometric quality factor Q (or onthe basis of STREHL's criterion, which has not been taken into consideration here), which permits linking the aberrations to the image spot broadening. To each value of $w$ and of $\rho = H/W$, there corresponds a mean quadratic value $<\delta\lambda>$ of the resolution, so that:

$$W_o^6\left[\frac{\chi^2}{175} + \frac{v^2\rho^2}{240} + \left(\frac{C_4v}{60} + \frac{v^2}{540}\right)\rho^4 + \frac{C_4^2\rho^6}{26}\right] + \quad (14)$$

$$W_o^4\left[\frac{C_{03}^2}{20} + \frac{C_{21}\rho^2}{36} + \frac{C_{21}^2\rho^4}{180}\right] \leq Q^2$$

where $\chi = C_{04} + C_4$ and $v = C_{22} + 2 C_4$

To the limiting resolution $<\sigma \lambda>$ are then associated slits of width $f = r Q$ and $f' = r'Q$. For slits of width $f_i > f$ and $f'_i > f'$ and of considerable heights $h$ and $h'$, in order to find out the practical resolution $\delta\lambda_p'$ one should first multiply the convolution of a rectangle function characterizing the entrance slit by the intensity distribution in the image plane. This computation is very complex, because of the literal expression taken by intensity distribution and, secondly, because of the use of straight slits in concave grating mountings which, particularly in the far-away ultraviolet range, produce a strong curvature of the spectral lines. Therefore, the image broadening results not only from the broadening $\delta\lambda_f$ linked to a double curvature of the spectral lines (the first curvature RC 1 being due to astigmatism and therefore, being linked to the term $C_{21}l^2w$ and the second RC 2 being due to the deviation from the dispersion law and therefore being linked to the term $C_{o1}w$). For values of $f_i$ and $f'_i$ much greater than $f$ and $f'$, and taking into account the high astigmatism value of concave mountings, one can show, within the context of the geometric assumption, that the practical resolution obtained in a "in plane" mounting with a straight exit slit of height $h'$ is practically equal to $$\delta\lambda_p = \sqrt{\delta\lambda^2 + <\delta\lambda>^2 + \delta\lambda_f^2} \quad (16)$$

In that expression, which has been checked experimetally, the value of $<\delta\lambda>$ is deduced from equation (14) in which it is considered that the term $C_{21}$ is zero (therefore, the contribution to image broadening due to the curvature of spectral lines is separated from that due to other abberations), the value of $\delta\lambda_f$ being equal to:

$$\delta\lambda_f = \frac{v'f_i}{v(di)} \quad (17)$$

and that of $$\delta\lambda_e = \frac{(h')^2 RC}{8 di} \quad (18)$$

$di$ being the mounting image dispersion.

This permits to conclude that, if in a mounting with simple grating rotation and at fixed distances between object and image, one uses a straight entrance slit of width $f_i$ and of height $h = h'e/e'$ and an exit slit of width $f'_i = \delta\lambda_p di$ and of height $h'$, the limiting resolution obtained is not $<\delta\lambda>$ but has the value of $\delta\lambda_p$ of equation (16) when $\delta\lambda c$ is of the same order of magnitude as $<\delta\lambda>$. Of course, the preceding approximation is also valid for low phase errors, in which case $<\delta\lambda>$ must be replaced by $\delta\lambda_f$. Computations have shown that it is possible to determine the values of non-negligible $h'$ for which this condition was satisfied for any one value of $2\theta$ comprised between 20° and 150°, provided that for $2\theta \leq 45°$ the curvature RC is taken equal to $RC_2$ (the astigmatism then is relatively slight) and that for $2\theta \geq 45°$ the curvature is that due to the astigmatism and provided further that the values retained for $\lambda_i$ and $\lambda_f$ have been adapted to the spectral range concerned (which latter obviously depends on the angle $2\theta$ see eq. 13), said provisions corresponding to the gratings generally used in the far-away ultraviolet range and presently available on the market. It should be noted that the middles of the entrance and exit slits are in the plane containing the line normal to the grating and perpendicular to the direction of the grating lines. In particular, equation (16) shows that, for the given slit characteristics, one may increase the flux by increasing $f$ and $h$ and $f'$ and $h'$, losing a little in resolution since $\delta\lambda_p$ will still be higher than $<\delta\lambda>$.

After experimental checking of the validity of equation (16), it has been noted that $\delta\lambda_p$ and $f'_i$ are monotonous functions of the wavelength decreasing for very low values of $\theta$ (for instance with $\theta = 10°$, $R = 400.7$ mm., $N = 1,200$ RPM, $W = 38$ mm., $L = 30$ mm., $h' = 4$ mm.), then increasing when $\theta$ increases, for instance $\theta = 20°$, $\theta = 30°$; finally, decreasing again for very high values of $\theta$ ($\theta = 75°$ for instance). The conclusion of the computations, confirmed by experimentation, shows therefore that there existed: two values $\theta^x$ of $\theta$ for which the variations of $\delta\lambda_p$ in function of the wavelength $\delta$ may be neglected. (The resolution being then constant in the whole spectral explored, $f'_i$ then generally varying with $\lambda$), two values $\theta_p$ and of $\theta$ for which the variations of $f'_i$ in function of the wavelength could be neglected (the resolution then being constant in the spectral range explored).

The last fact is important for producing commercial intruments, since one may produce a high-flux monochromator with slits of fixed width for a very low cost price.

The $\theta_p$ computations may be performed in the following manner: firstly, for a given grating and for a given value of $f_i$ and $h'$. there is computed, for each value of $\theta$ in question, the value of the drop image and object distances deduced from the equation (4) in which:

$$H(\lambda) = \cos \alpha + \cos \beta + \frac{R W_o^2}{2}\left[\frac{6}{2} X^2 + \frac{1}{3} v\rho^2\right] + 2C_{02} \quad (19)$$

$W_o$ being given by the simplified equation (14) ($C_{21} = 0$).

Considering the indications given above, the final values obtained for $r$ and $r'$ take the aberrations into account and lead to computation of $<\delta\lambda>$ and of $\delta\lambda_c$ (equation 18). One then computes $\delta\lambda_f$ for the value $f_i$ in question and, finally $\delta\lambda p$ and $f'_i$ in function of $\lambda$. The plotting of curves $f'_i = \Phi(\lambda)$ for each $\theta$ permits then to select the values $\theta_p$ of $\theta$. This may be done automatically by a program in which $\theta$ is made to vary from minute to minute, the value of $\theta_p$ chosen being that for which:

$$\frac{1}{2}\left[\frac{f'(\lambda\mu) - f'(\lambda\min)}{f'(\lambda\mu) + f'(\lambda\min)}\right] \leq D \quad (20)$$

where $f_i(\lambda\mu)$ is the value of $f'_i$ for the maximum wavelength of the spectral range considered and where $f_i(\lambda \min)$ is that corresponding to the minimum wavelength, the quantity D definging the desired accuracy, which, in practice, may be on the order of $10^{-2}$.

Table 1 below gives two examples for which the value of $\theta_p$ has been determined with $f_i = 10\mu$.

| R mm | N tr/mm | $W_o$ mm | $L_o$ mm | r mm | r' mm | $2\theta$ | h mm | fi mm | min A | max A |
|---|---|---|---|---|---|---|---|---|---|---|
| 400.7 | 1200 | 38 | 30 | 152.28 | 94.47 | 144° 52' | 6 | 0.195 | 50 | 1100 |
| 500. | 1221.2 | 54 | 54 | 412.06 | 594.51 | 28° | 8 | .007 | 350 | 4000 |

Further to the typical two applications above referred to the method of focalizing concave gratings according to the invention thus permits, by starting from equation 4, to produce monochromators with a simple rotation ($\gamma$) mounting of the grating about an axis passing through its summit, the object distance $r = Re$ and image distance $r' = Re'$ ($R$ being the radius of curvature of the grating) being fixed and function of the angle $2\theta$, under which the two slits are seen from the summit of the grating. Such an arrangement gives very luminous or bright mountings, which possess sufficient resolution for most industrial control work and even for advanced research.

Furthermore, the inventor has established that the best image plane may be defined by taking into account not only the aberrations of the concave grating but also those resulting from the lighting conditions of the grating in said mountings. In fact, it has appeared that, either due to the nature of the source or to the transfer optics focalizing a far-away source on the entrance slit, there may be introduced additional aberrations $\Delta^x(w,l)$ at the entrance slit level. Under these conditions, the value of the total aberrant optical path in the image plane is:

$$\Delta''(w,l) = \Delta'(w,l) + \Delta^x(w,l) \quad (21)$$

as indicated previously, one may place $\Delta''(w,l)$ in the form of:

$$\Delta''(w,l) = \Delta''_1(w,l) + C_1w + C_{01}w + C_1^xw + \Delta'_2 (w,l) + C_2w^2 + C_{02}w + C_2^xw \quad (22)$$

with separating the even terms in $w$ and $l$ from odd terms and by considering that $\Delta^x(w,l)$ represents basically a setting defect and an image tilting.

The odd terms are defined as follows.

$$\Delta_1(w,l) = \Sigma_{ij} C_{ij} l^i w^j \simeq C_{03}w^3 + C_{21}l^2w$$

$C_{ij}$ representing the coefficients of concave grating aberrations for which $i = 0.2$ and $i + j = 3.5$.

$C_{01}$ is a term which is a function of the height $h'$ of the exit slit $C_1^xw$ is a term of the first order, linked to the instrument lighting method.

$C_1w$ is a term translating the tilting of the reference sphere and determining the maximum intensity position which, for a value $\alpha$ of the angle of incidence, is in the direction $\beta + \Delta\beta$, such that:

$$\sin \beta = \pm KN\lambda - \sin \alpha$$

$$\Delta\beta \cdot \cos \beta(\beta + \Delta\beta) = \left[1 - \frac{(h')^2}{(r')^2}\right] \simeq -\left[C_{03} + C_{21}\frac{\rho^2}{3}\right]\frac{W_o^2}{4} + C_1^x \quad (24)$$

if the geometric quality criterion, previously defined, is taken into consideration. The terms of even order, determining the value of H ($\lambda$), as expressed by:

$$-\Delta'_2(w_l l) = \sum_{ij} Cijl^i w^j \simeq C_{22} w^2 l^2 + C_{03} w^4 + C_4(w^2 + l^2)^2$$

$C_{ij}$ characterizing the coefficients of concave grating aberrations for which $i = 0.2$ and $i + j = 4.6$.

$C_{02}w^2$ is a term which is a function of the height $h'$ of the exit slit.

$C_2^xw^2$ is a term of the second order, linked with the instrument lighting method.

$C_2w^2$ characterizes the displacement of the reference sphere in the direction $\beta$ and, therefore, the value of which deduced from the geometric quality criterion, permits to compute H ($\lambda$) which is expressed by:

(25)

-continued $$H(\lambda) = \cos \alpha + \cos \beta + \frac{R\, W_o^2}{2}\left[\frac{6}{5} X + \frac{v\rho^2}{3}\right] + 2C_{02} + 2C_2^2$$

with:

$$\chi = C_{04} + C_4;\ \nu = C_{22} + 2\, C_4,$$

$W_o$ being the ruled width, $p$ the ratio $L_o W_o$ and $L_o$ the ruled height.

The image focalization plane, i.e., the value of $r'$ is therefore chosen so that the sum of the different setting defects (that due to the height of the slits $C_{02}$ plus that due to the lighting method $C_2$ plus that of the displacement $C_2$ sought) be such that the aberrations of the 4th order are compensated and that the final limiting resolution is that given by the aquation (14).

An important special case, which may be treated by the invention, is the one in which the lines emitted by the source are broadened by the Doppler effect, i.e. for the emitting particles (ion atoms or molecules) animated with a high speed $v$ (with $\phi = v/c$, $c$ being the speed of light). It is well known that if such a source is observed with an optically corrected monochromator, one obtains in the image plane, even for an infinitely fine entrance slit, an image spot with the minimum width equal to:

$$\delta\lambda_D = \frac{\lambda\, \phi\, W_o \cos\beta}{r} = \frac{\phi}{r} \cos\beta \left(\frac{\sin\alpha + \sin\beta}{K\,N}\right) \quad (26)$$

in the case of a sighting perpendicular to the particle trajectory.

It has been noted that such a broadening $\delta\lambda_o$ which currently reaches several angstroms may be decreased by a displacement of the image plane, this displacement being a function not only of $\phi$ but also of $\lambda$. In practice the user should therefore modify the value of $r'$ when the spectrum moves in front of the exit slit. In fact, in the method of correcting aberrations through displacement of the reference sphere, it may be assumed, as a first approximation, that this broadening is equal to that which would be observed with a classical source if the setting plane were $(r' + \Delta r')$ instead of $r'$, $\Delta r'$ being such that:

$$\cos^2\beta\left[\frac{\Delta r'}{(r')^2}\right] = \frac{K\,N\, \delta\lambda_D}{W_o} \simeq K\,N\, \lambda\, \phi\, \frac{\cos\beta}{r'} = \quad (27)$$

$$(\sin\alpha + \sin\beta)(\cos\beta)\frac{\phi}{r'}$$

Therefore, everything takes place, in the first approximation, as if there were an additional instrumental setting defect, such as:

$$2C_2 \simeq -K\,N\,\lambda\, \phi\, \frac{\cos\beta}{r'} = -\phi\, (\sin\alpha + \sin\beta)\frac{\cos\beta}{r'} \quad (28)$$

In that case, the equation (4) will be solved by taking into account equations (25) and (28) so as to determine, for a given spectral interval, such a couple of values, $\alpha, \beta$, $r$ and $r'$, that the values of $r$ and $r'$ are independent of the wavelength and that to each value of corresponds, therefore, a fixed image plane for an extensive spectral interval.

In particular, considering that such sources generally have little intensity, one may treat the case of large straight slits, as indicated beforehand, and, in particular, determine the angle $\delta 4\ _p$, for which the exit slit width is fixed, without leading to a loss of flux.

Finally, on the Doppler broadening is superimposed a generally small Doppler displacement which, still for the perpendicular sight, is expressed by:

$$\delta\lambda_D = \tfrac{1}{2}\, \varphi^2 \lambda \quad (29)$$

i.e. such that $$K\,N\,\Delta\,\lambda_D = \cos(\beta + \Delta\beta_o) = \quad (30)$$

$$K\,N\,\lambda\, \frac{\phi^2}{2} = (\sin\alpha + \sin\beta)\frac{\phi^2}{2}$$

The maximum intensity is then found in the direction $\beta + \Delta\beta$ so that:

$$\Delta\beta\cdot\cos\beta = \left[C_{03} = C_{21}\frac{\rho^2}{3}\right]\frac{W_o^2}{4} + \quad (31)$$

$$(\sin\alpha + \sin\beta)\frac{\phi^2}{2}$$

In the appended drawings are shown various states of the known techniques, as well as curves and mountings according to the invention.

Figure 5:
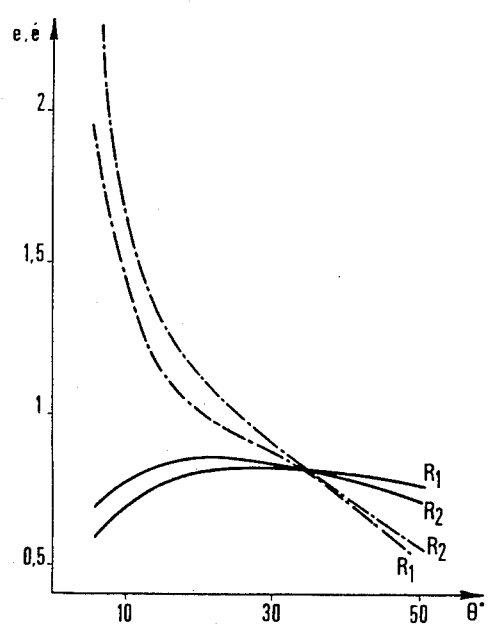

FIG. 5 gives the values of object and image reduced distances in function of $\theta$.

Figure 6:
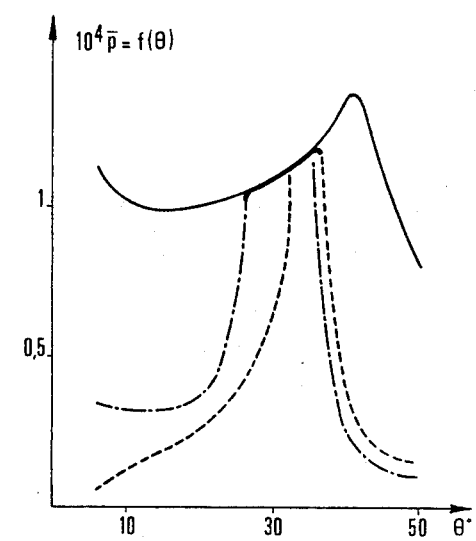

FIG. 6 is a diagram giving the value of $\bar{p}$ for different mounting of FIG. 3, built according to the invention (small aberrations case).

Figure 7:
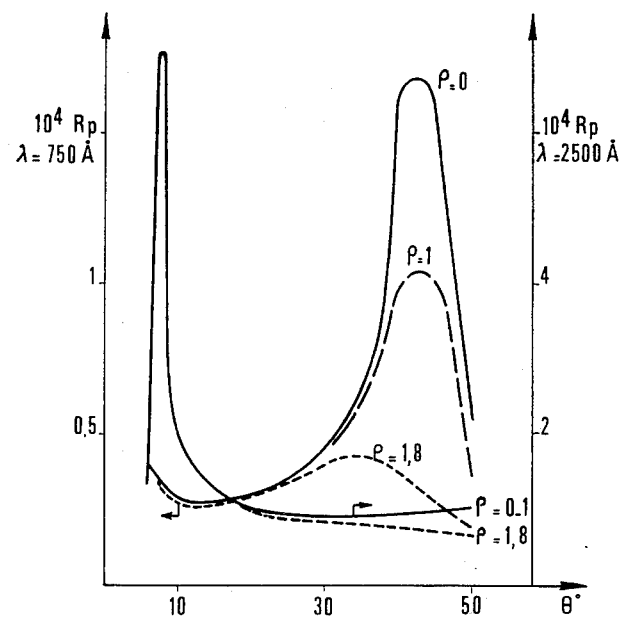

FIG. 7 gives the resolving power values in function of $\theta$ for a given grating (large aberrations case).

FIG. 8 (8a through 8d) gives the basic diagram of the different asymmetrical focalization mountings with simple concave grating rotation and brings out the values of incidence and diffraction angles $\alpha$ and $\beta$ As, in general, in the mountings $M_2$ and $M_3$, the two aforementioned curvatures are of contrary directions, one of these mountings is preferable to the two others.

Figure 9:
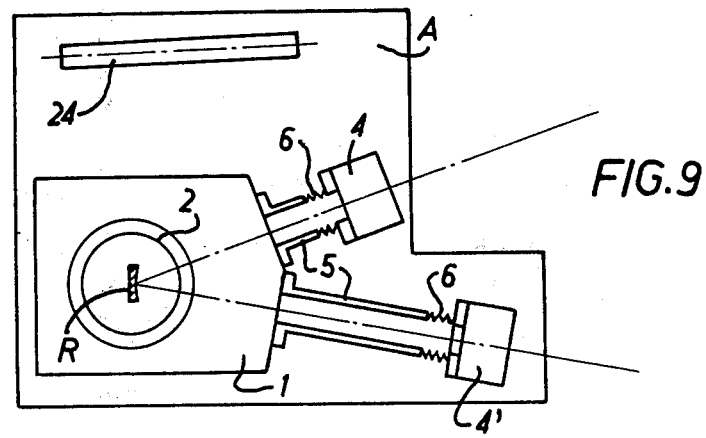

FIG. 9 is a view from the top, with partial cross-section of a monochromator applying the invention process with straight slits of fixed width.

Figure 4:
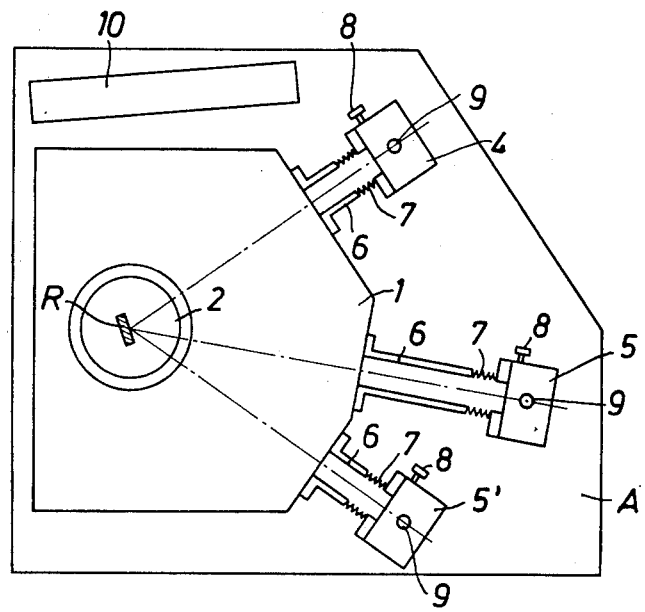
FIG. 4 is a view from the top, with partial cross-section, of a monochromater applying the invention process with fine slits, straight or curved.
Figure 4A:
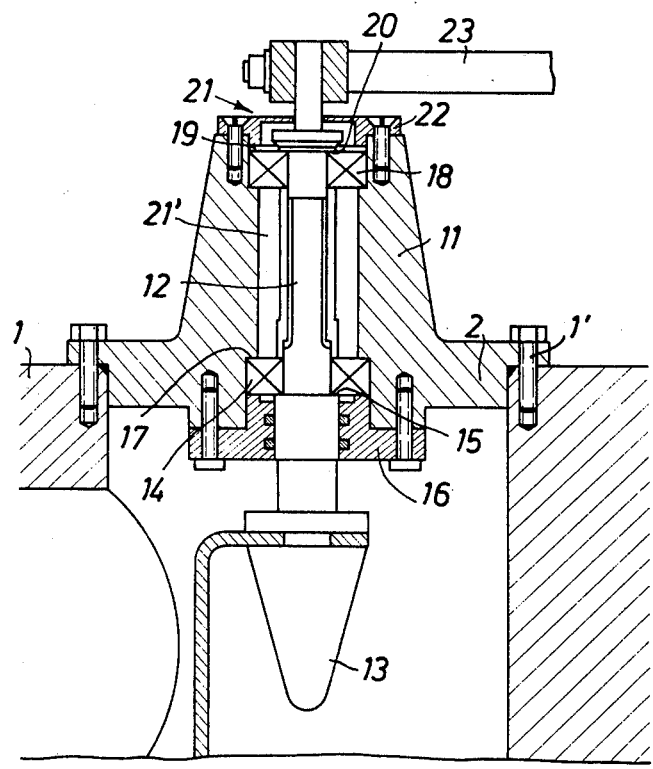
FIG. 4a is a view in vertical cross-section
Figure 9B:
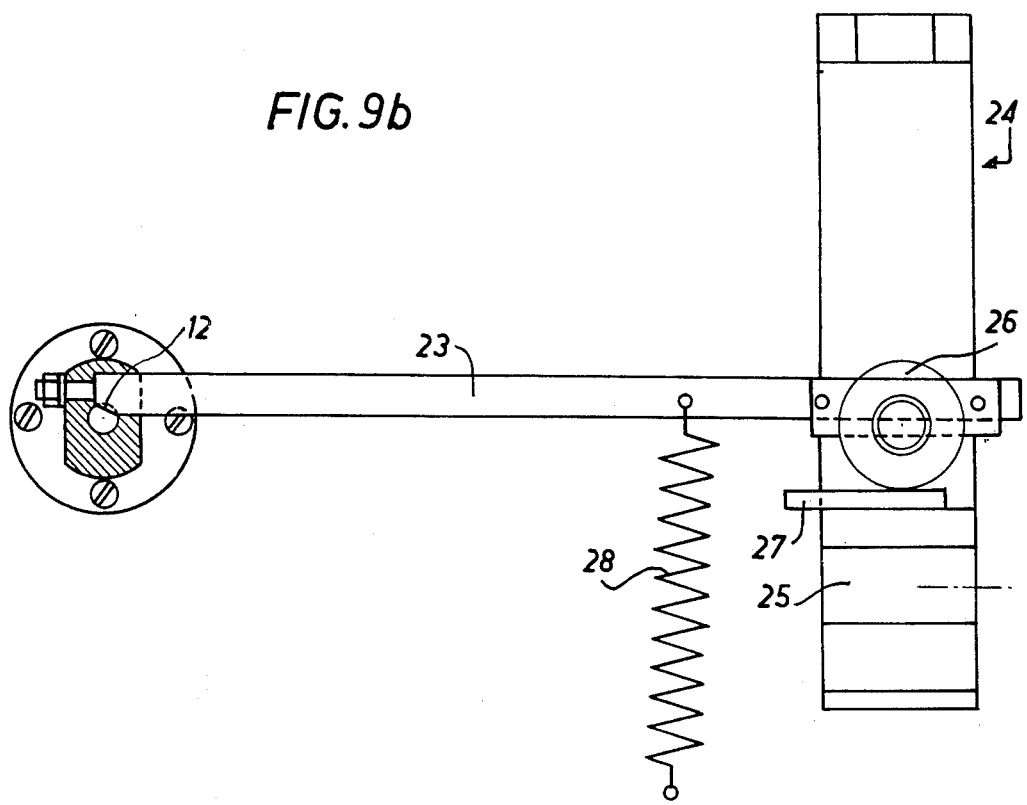
Figure 9B:
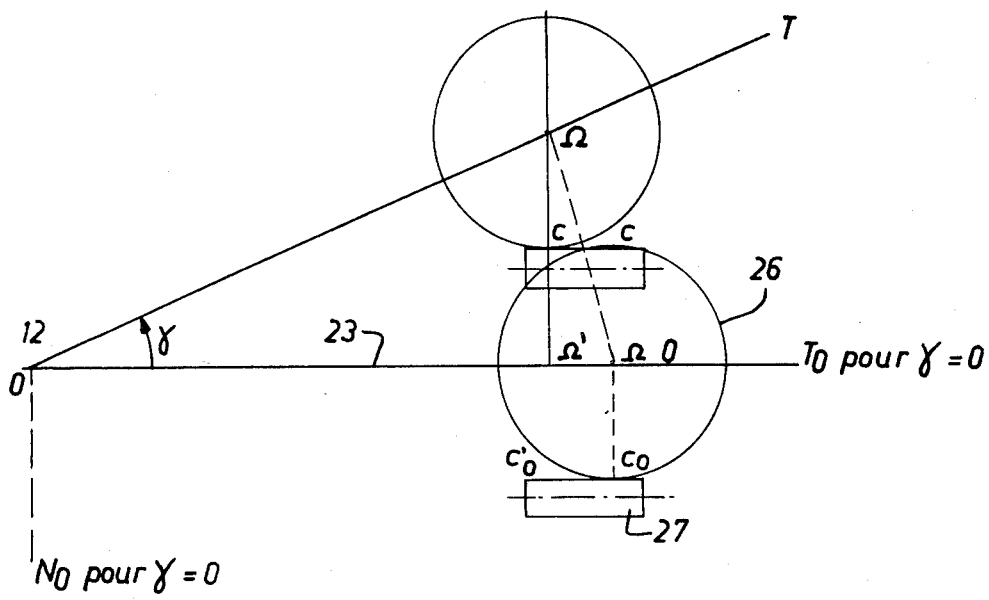
Figure 9A:
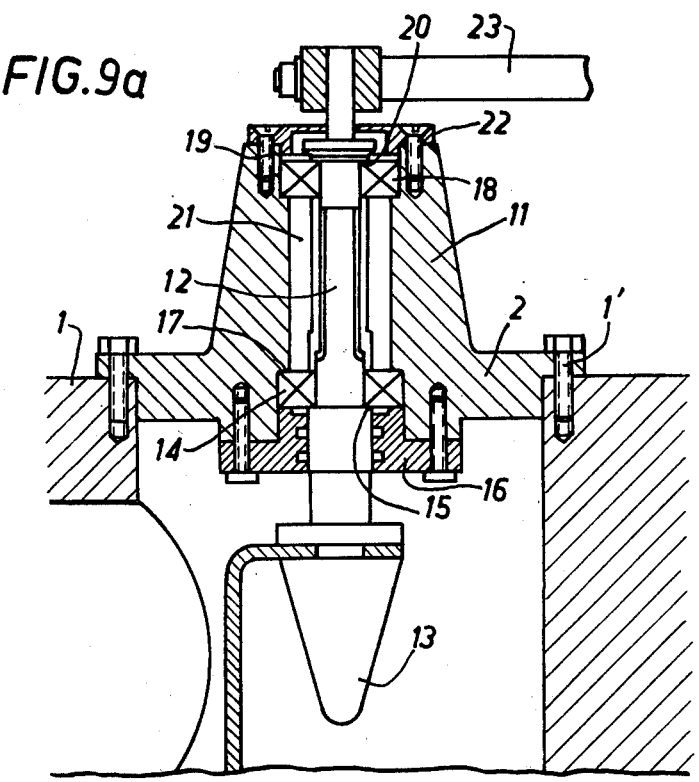

FIG. 9a is a partial cross-section (FIG. 4a of the patent).

FIGS. 9b-9b' show the wavelength control and its operation.

Figure 10A:
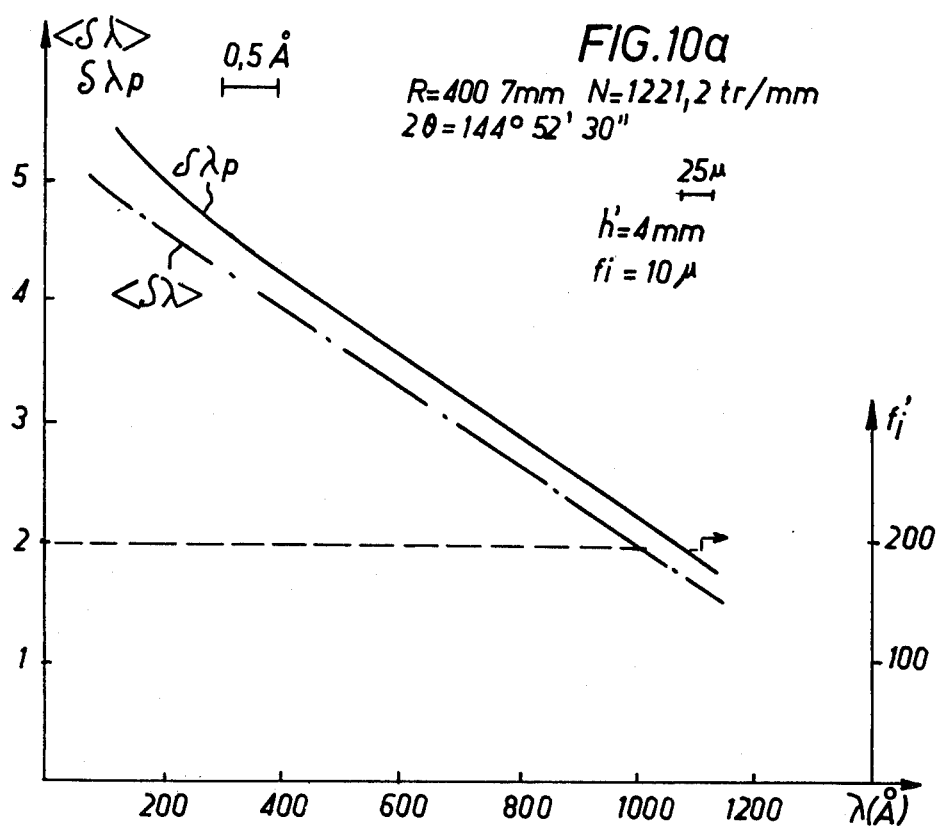
Figure 10B:
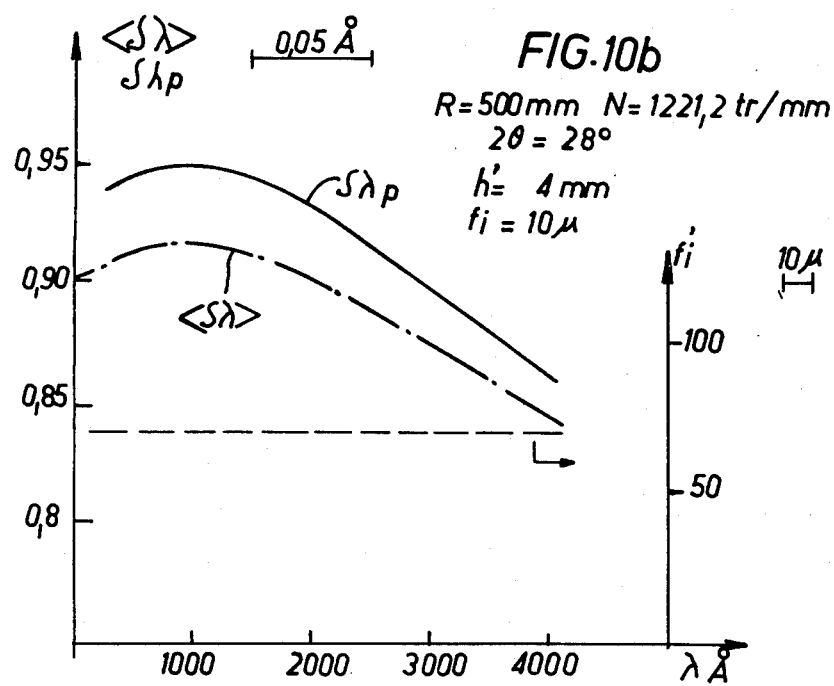

FIGS. 10 and 10b are diagrams showing, for the examples given the value of $<\delta\lambda>$ and the practical resolving power obtained.

Figure 11:
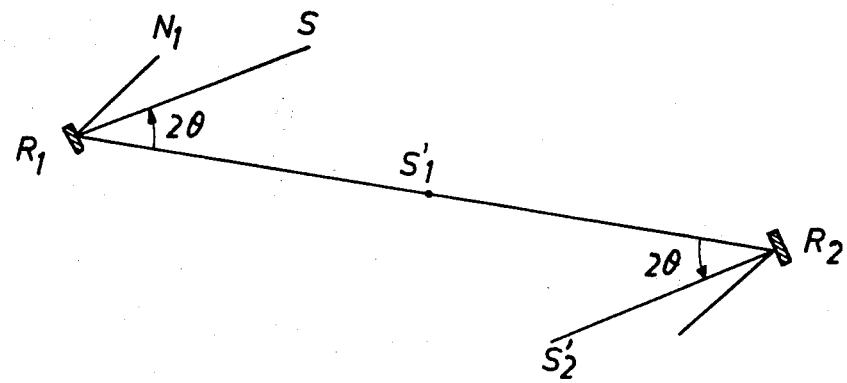

FIG. 11 shows, schematically, a double monochromator with Z mounting.

Figure 4B:
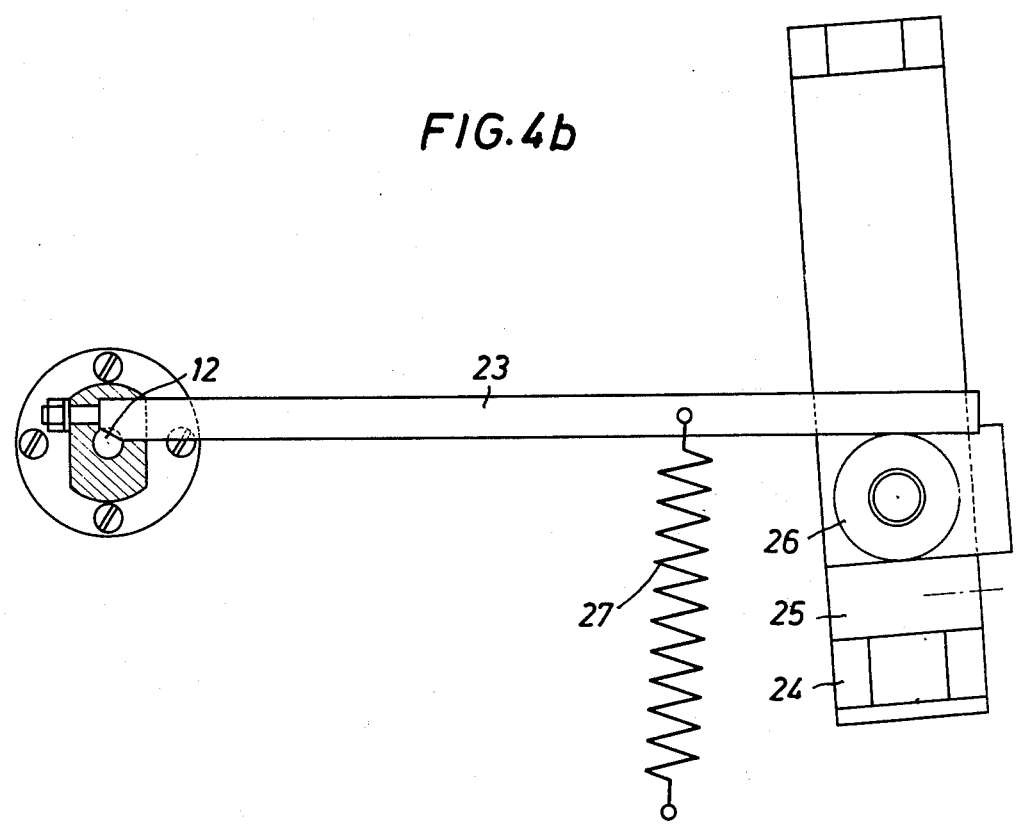
FIG. 4b shows the control in wavelength

In the example shown in FIGS. 4, 4a and 4b, the monochromator is supported on a vacuum frame, itself supporting a platen or plate A, on which the various components are arranged, according to FIGS. 4, 4a, 4b and 4c.

The non-detailed vacuum frame supports a mounting plate A, on which are assembled, on one hand, a central unit 2, in which is housed the concave grating R and the rotation mechanism 3 of the grating and, on the other hand a unit 4 supporting the entrance valve-slit and, finally, units 5 and 5' with the exit valves-slits. The units 4, 5 and 5' are connected to unit 1 by tubes 6 equipped with bellow diaphragms, for instance in "TOMBACK", vacuum-sealed, which permit the slit positions to be adjusted by screws 8, provided on each unit 4 through 5' and caused said units to move respectively in non-shown slideways provided in the platen A. In each unit 4, 5, 5', the slit width mays be adjusted by any known suitable device 9.

The platen A also supports a wavelength control mechanism 10, described further on.

In FIG. 4a, it is seen that the unit 2, fastened in unit 1 by bolts and nuts 1', includes a conical part 11 arranged vertically with an axial bore, of which the pin 12 forms the axis of rotation of the grating R, the lower end of pin 12 being integral with said grating R mounted in a support 13, fastened to unit 2 by any suitable means. The shaft-pin 12 is maintained in a direction that is well defined mechanically by an assembly of two ball bearings, of which the first 14, fitted on the rotation pin is maintained in position by a shoulder 15 of the shaft and applied by a part 16 against an internal shoulder 17 of the conical part 11, and of which the second 18 is maintained against the internal shoulders 19 of parts 11 and 20 of the shaft by two spacers 21'', the tightening being done by an assembly 21 with nut and lock 22. The free end of the pin 12 projects above the assembly 22 and bears a horizontal arm 23 rigidly fastened on the shaft, which plays a part to be described hereafter.

Figure 4C:
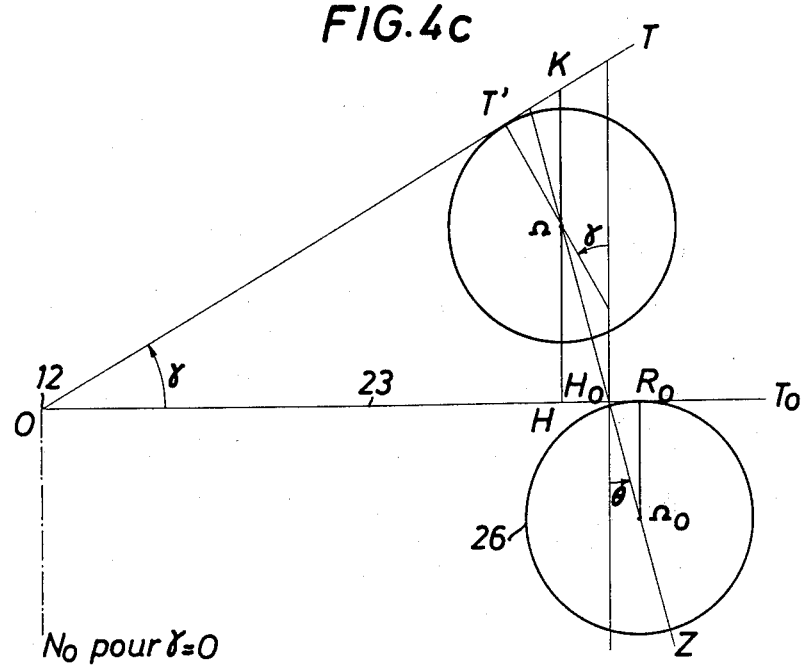
FIG. 4c is a diagram corresponding to the monochromator of FIG. 4.

The arm 23 is here parallel to the tangent to the summit of grating R (see FIGS. 4b and 4c). However, one may impart to it any other desired or advantageous orientation, fixed with respect to this grating, integral with the mounting plate A. A tappet 24 supports a drive component indicated in 25 to displace a roller 26 at will along the axis of the tappet. The roller 26 is applied against the arm 23, the contact between roller and arm being provided by a return spring 27, acting on said arm. Under these conditions, the displacement of roller 26 along its tappet 24 imparts to arm 23 a rotation which permits the wavelengths to move along the exit slit. In addition, one can thus measure, with sufficient approximation, the wavelength which is expressed by:

$$\lambda = 2/N \cos\theta \sin\gamma \qquad (32)$$

The simple motion above results from a thrust against the arm 23 by a roller 26, consisting of a ball bearing of radius u, being displaced laterally in function of time, along a direction HoZ, forming an angle $\phi$ with respect to a parallel to the direction of the normal for the value $\gamma = 0$ of the rotation, i.e. for the central spot ($\lambda = 0$).

To obtain an exact measurement of the wavelength, it suffices, according to equation (13) for the value of sin $\alpha$ obtained by a displacement $\overline{\Omega_o \Omega} = Z = a\,l\,k\,t$, ($\Omega_o H_o = a\,l; O\,H_o = l$) to be a linear function of the time.

It may be easily shown that:

$$\Omega_o R_o = \Omega T = u = al \cos\phi$$
$$\sin\gamma = \frac{a\cos\phi}{1 + a(1-kt)\sin\phi}[kt + (1-kt)(1-\cos\phi)]$$

The function sin $\gamma$ obtained is a complex function in the general case. However, it should be noted that, for the special value $t = i/K = t_l$, $\gamma$ takes on the value $\gamma_1$, such that sin $\gamma_1 = a \cos\phi = u/2$ For this value $t_l$ of $t$, the wavelength is measured accurately (rolling effect). By adding the further condition $$a\sin\Phi = \frac{u}{l}tg\phi \leqq 1$$

i.e. for low values of $\phi$ and low values of the ratio $\mu/l$ one may write that:

$$[1\ 3^+\ a\ (1,-kt)\sin\phi]^{-1} = 1 - a(1-kt)\sin\phi$$

From this is deduced:

$$\sin\gamma = (\cos\phi)\,kt + = u/l\,kt + b$$
$$b = a(1-kt)\cos\phi[(1-a\sin\phi)(1-\cos\gamma) - a\,kt\sin\phi\cos\gamma]$$

There is then introduced a non-linear term b. For a restricted spectral range, i.e. for low values of $\gamma$, b may be simplified by making the following approximation:

$$1 - \cos\gamma = \sin^2\gamma/2$$

The function sin $\gamma$ then takes the form:

$$\sin\gamma = X + 0.5(X_1 - X)(1 - X_1 tg\theta)(X - X_3)$$

with $$X = \frac{u}{l}kt$$

$$X_1 = \frac{u}{l}$$

$$X_3 = \frac{2\,tg\,\theta}{1 - X_1\,tg\,\theta}$$

The wavelength is then measured accurately for:

| | |
|---|---|
| $X = 0$ | $\lambda_1 = 0$ |
| $X_1 = \frac{u}{l}$ | $\lambda_2 = \frac{2\cos\theta}{N}X_1$ |
| $X_3 = \frac{2\,tg\,\theta}{1 - \frac{u}{l}tg\,\theta}$ | $\lambda_3 = \frac{2}{N}\cos\theta\,X_3$ |

As a practical example: by giving to u/l a value of 15 mm., to l a value of 300 mm. and to $\phi$ a value of 4°, one may obtain an accuracy of $+1$ angstrom over an interval of 2,300 angstroms.

It can be seen therefore that the very simple mechanism described above permits the use of grating rotation for giving a quite accurate indication of the wavelength value.

Hereafter are examined more in detail the cases of two gratings, respectively:
R₁ (radius R = 500 mm., N = 1,831.8 lines/mm.)
and R₂ (radius R = 500 mm., N = 1,221.2 lines/mm.)
The corresponding mountings have been effected with straight slits 10 mm. high and of width equal to:

$$\frac{r N K \lambda}{\cos \alpha\, R_p} = f \text{ for the entrance}$$

$$\text{and to } \frac{r' N K \lambda}{\cos \beta\, R_p} = f \text{ for the exit slit,}$$

monochromators and for multiple-exit monochromators.

For simple monochromators, we have first examined the results and conditions according to STREHL criterion. The values of $e$ and $3'$ in function of $\theta$ are shown in FIG. 5. It is seen that they depend considerably on the value of N, but if the value of the radius of curvature is doubled, the values of $e$ and $e'$ remain practically unchanged. For a stripped height of 25 mm., the values of W fall between 10 and 14 mm. for $\theta$ varying from 6° to 45° for a reference wavelength of 750 Angstroms. It should be recalled that the STREHL criterion does give different W values for each value of $\lambda$. For a practical realization, we have chosen a mean value corresponding to a given value of the wavelength. It should be noted that beyond $\theta = 50°$, the STREHL test cannot be satisfied for the ruled height in question and that below $\theta = 6°$, the values of $e'$ (mountings of FIGS. 3a and 3d) or of $e$ (mountings of FIGS. 3b and 3c) are too high for practical realizations.

FIG. 6 gives the value $\bar{p} = f(\theta)$ for the grating R₁ and the different mountings. The solid-line curve represents $R_p/1.54$, the part in bold solid lines determining the range of $\theta$ for which the limiting resolution $R_p$ shall be reached in a spectral range from 200 to 3,200 angstroms. For the mountings of FIGS. 3a and 3d, the range extends from approximately 32° to 36°30′, while for FIGS. 3b and 3c, the $\theta$ range is between 26° and 36°. For the grating R₂, the $\theta$ range extends between 30° and 40° for the mountings of FIGS. 3a and 3d.

Therefore, the condition 12 limits the possible range for angle which corresponds to values of $e$ and $e'$ that are perfectly compatible with the convenient realization of a monochromator.

Figure 1:
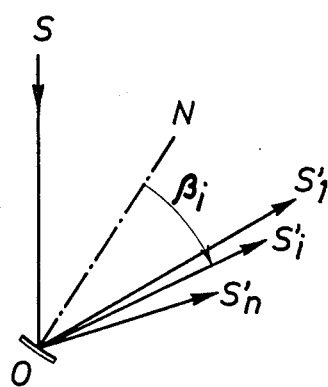
FIGS. 1 through 3d represent schematically the phenomena said mountings according to known technique.
Figure 2:
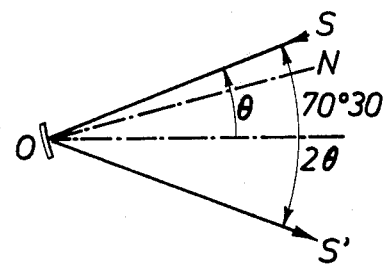
Figure 3A:
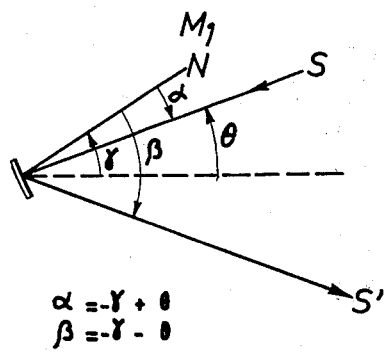
Figure 3B:
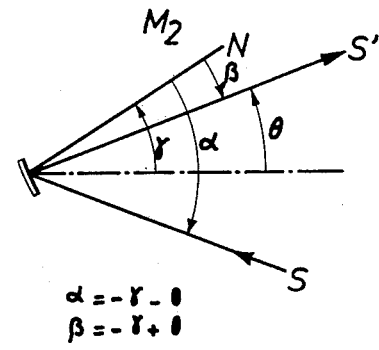
Figure 3C:
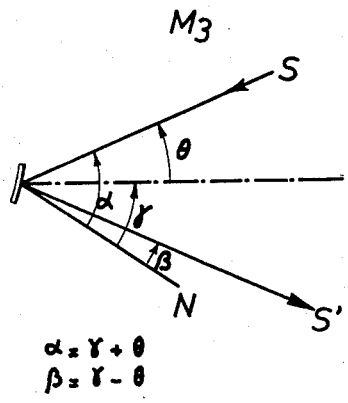
Figure 3D:
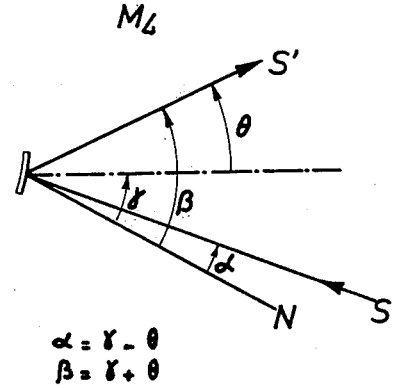

If one is satisfied with a resolving power on the order of 5,000, the mountings of FIGS. 3a and 3d (grating R₁) may then be used between 27°30′ and 39°30′ and the two others between 20°30′ and 39° approximately.

In conclusion, the use of grating R₁, with an optimum ruled area of 11 × 25 mm., permits to obtain an optimum resolving power of 7,500 for 26° < $\theta$ < 36°30′. However, for reasons of brightness, it is then preferable to take into consideration a quality factor Q.

We have then examined the results and conditions according to the quality factor Q.

Computations have shown that for $W_o$ = 30 mm. and $L_o$ = 54 mm. ($p$ = 1.8) the values of $e$ and $e'$ shown on FIG. 5 are still valid in practice. The limiting resolving power $R_p$ for the different values of $p$ is shown in function of $\theta$ on FIG. 7 for the two wave lengths $\lambda_i$ and $\lambda_f$ chosen.

Their values yield $\delta \lambda$ inst. a minimum in the spectral range in question. For $p$ = 1.8 and for $\theta$ between 6° and 50°, the practical limiting resolving power shall be from 3,000 to 750 angstroms and from 8,000 to 2,500 A. Like previously, the validity range is limited by the desired value of $R_p$. If it is desired to retain the preceding values, computations show that the interval of $\theta$ increases, on the one hand, when passing from the mounting of FIG. 3b to the mounting of FIG. 3a and with $p$, on the other hand. For $p$ = 1.8, the grating R₁ may be used for values of $\theta$ between 22° and 40°, and the grating R₂ between 20° and 50°. In conclusion, the use of grating R₁, with an optimum ruled area of 30 × 54 mm., permits to obtain a limiting resolving power between 3,000 and 8,000 approximately, for 22° < $\theta$ < 40°. With identical resolution, this second solution thus proves to be much more interesting, since it corresponds to a gain in brightness by a factor of 5.9.

The result of these two last statements, based on the use of the selection criterion $p = f(\theta)$, is that only the mounting of FIG. 3a should be chosen and that there is a limitation of $\theta$ range which depends basically on the value of $R_p$ desired. The latter will be maximum for any value of $\theta$ between 22° and 40° for grating R₁ and between 20° and 50° for grating R₂.

The following table gives the values of the different parameters: W. L, $e$ and $e'$ for gratings R₁ and R₂ and two particular values of $\theta$.

| Grating R₁ | $W_o$ = 30 mm | $L_o$ = 54 mm |
|---|---|---|
| $\theta$ = 40° | $e$ = 0.80386 | $e'$ = 0.72306 |
| $\theta$ = 30° | $e$ = 0.82789 | $e'$ = 0.91332 |
| Grating R₂ | $W_o$ = 30 mm | $L_o$ = 54 mm |
| $\theta$ = 50° | $e$ = 0.76897 | $e'$ = 0.51620 |
| $\theta$ = 20° | $e$ = 0.85117 | $e'$ = 1.0557 |

The advantages of such a focalization process are many:

From the optical point of view: the maximum performance characteristics of the grating in this mounting may be reached. The incident and diffracted beams are fixed and it is therefore possible to place an additional optical device in front or rear of the slits. The axis of this device does not have to be changed in function of the wavelength.

From the mechanical point of view, a simple rotation is always easier to achieve than a translation, above all when the parallelism tolerances are severe, as is the case for diffraction gratings. In particular, this mounting proves to be particularly advantageous in the case of gratings with large radius or curvature.

Since the wavelength $\lambda = (2 \cos \theta) \sin \gamma/\lambda$ is directly proportional to $\sin \gamma$, direct reading of the wavelength value is easy, which is not the case of mountings for which the grating is displaced, the value of $\theta$ not being constant in function of $\lambda$. Therefore, this type of monochromator may be produced for a low cost price.

The spectrometers using the process according to the invention present a special interest in the spectral range for approximately 20 to 3,000 A, even if they may be used from extreme ultraviolet to far-away infrared. In this spectral range of far-away ultraviolet, the absorption phenomena require, on the one hand, work in a vacuum and, on the other elimination of the use of refrigent materials, which are no longer transparent below 1,100 A. In addition, because of the relatively low values of reflecting power, the use of a concave grating, ensuring simultaneously the diffraction and focalization of electromagnetic radiations, is particularly interesting in this spectral range.

For multiple-exit monochromators, i.e. including a fixed direction of the incident beam and several fixed directions delivering simultaneously different wavelengths, the following may be assured:

a. Simultaneous performance, with high resolution, of different types of experiments in an identical spectral range;

b. Simultaneous performance, with variable resolution, of the same experiment in different spectral ranges;

c. Simultaneous photometric measurements in different spectral ranges.

The examination of curves of FIG. 5 shows that two values of $\theta$ correspond to a value of $e$. For these two values, good resolution may be obtained if the values of image distances are those given by the curve $e' = f(\theta)$. If a resolution of 0.3 A is required (grating $R_1$ in the mounting of FIG. 3a) to an object distance equal to 0.82 R may correspond two exits, one at an angle $2\theta = 44°$ ($r' = 1.08$ R), the other at an angle $2\theta = 68°$ ($r' = 0.84$R).

If one adopts for the grating $R_1$ in the mounting of FIG. 3a, an object distance $r=Re = 0.81$ R, one may choose $\theta$ to cover a spectral range from 80 to 3,400 A for the following values of $e$, $e'$ and

| Ruled area 30 × 54 mm2 | $\theta = 14°$ | $\theta = 35°$ | $\theta = 75°$ |
|---|---|---|---|
| e = | 0.81 | 0.81 | 0.81 |
| e' = | 1.391 | 0.833 | 0.4203 |
| Mean resolution | 5 Å | 0.3 Å | 5 Å |
| Spectral range | 1500–4300 Å | 500–3000 Å | 80–750 Å |

In the case of photometric measurements of reflectance or polarization, a resolution of a few angstroms is acceptable. On the other hand, it is often advantageous to make these measurements on a vast range of wavelengths, which at present requires the use of two different mountings with hard to compare characteristics. The grating $R_1$ in the mounting of FIG. 3a can work between 1500 and 4300 A if $2\theta = 29°$ ($r' = 1.44$R) and between 200 and 2000 A if $2\theta = 100°$ ($r = 0.518$R) for a single object distance equal to 0.77 R. In addition, a similar mounting might prove to be interesting on the one hand for measuring the efficiencies gratings in function of the interference order and, on the other for calibration of sources and receivers.

Since the values of $e$ in the mounting 3a (or 3d) are equal to the values of $e'$ in the mounting 3b (or 3c) and conversely for $e'$, it becomes possible to obtain in the same manner a mounting having two entrances and one exit.

If the wavelength observed on the first beam is $$K_1 \lambda_1 = 2 \sin \gamma \cos \theta_1 / N$$

that on the second beam should be such in this case that:

$$K_2 \lambda_2 = 2 \sin \gamma \cos \theta_2 / N = K_1 \lambda_1 \cos \theta_2 / \cos \theta_1$$

A wavelength $\lambda$ may be observed in order 1 ($K_1=1$) and in order 2 ($K_2 = 2$) simultaneously if $\cos \theta_2 = 2 \cos \theta_1$. The use of grating $R_2$ in the mounting of FIG. 3a with an object distance $r = 0.6$ R, permits to obtain this condition if, approximately, $\theta_1 = 60°45'$ ($r' = 0.38$ R) and if $\theta_2 = 4°$ ($r' = 21.1$ R), only a wide passband ($\geq 10$ A) being required for this type of work.

In the example shown in FIGS. 9, 9a, 9b, 9b', the monochromator is supported on a vacuum frame, itself supporting a mounting plate A, on which the various components are arranged according to FIGS. 9 through 9b'. In particular, FIG. 9 shows the mounting equipped with a 500 mm. grating, but the mounting principle of the different components shown on FIGS. 9 through 9b' remains, of course valid for any other value of R, it being understood that, in each case, the slit position is adjusted to the fixed distance and for the $2\theta_p$ angle envisaged.

The following are assembled on the platen A: on the one hand, a central unit 1 in which the concave grating R is housed, as well as the rotation mechanism 3 of the grating (FIGS. 9a and 9b) and, on the other, units 4 and 4' including the entrance valve-slit and exit valve-slit assembly. Units 4 and 4' are connected to unit 1 by tubes 5, equipped with bellow-diaphragms 6, made of Tomback for instance, vacuum sealed, which permits shop adjustment of the slit position. Units 4 and 4' may be displaced in translation in direction of the grating, said units being guided by slideways provided on mounting plate A. The slideways include a reference mark which is made to coincide, by any suitable optical means, with the reference marks scribed on units 4 and 4'. In each unit 4 and 4' are provided slits of fixed width, mounted in a tube permitting adjustment of the slits in rotation, the final locking being ensured by an assembly of opposed screws.

In FIG. 9a, it is seen that the unit 2, fastened in the central unit 1 by bolts and nuts 1', includes a conical part 11, arranged vertically, with an axial bore of which the pin 12 forms the axis of rotation of grating R. At its lower end, the pin 12 is integral with said grating R, which rests on a support 13 fastened to unit 2 by any suitable means. The shaft-pin 12 is maintained in a direction which is well defined mechanically by means of an assembly of two ball bearings, of which the first 14, fitted on the rotation axis, is maintained in position by a shoulder 15 of the shaft and is applied by a part 16 against an internal shoulder 17 of the conical part 11, and of which the second 18 is maintained between the internal shoulders 19 of part 11 and 20 of the shaft two spacers 21, the tightening being done by a nut and lock assembly 22.

The free end of the pin 12 projects above the assembly 2 and carries a horizontal arm 23, rigidly fastened on the shaft, the role of which will be explained later.

The arm 23 is here parallel to the tangent to the summit pf grating R (FIGS. 9 and 9b'). However, one may inpart to them any other orientation, desired or advantageous, fixed with respect to the grating. Integral with the mounting plate A, a tappet 24 carries a drive component indicated in 25 to cause the displacement of a roller 26, at will, along the tappet axis. This roller, which may be a ball bearing, is mounted on arm 23 by the intermediary of a sliding part permitting to adjust the distance cel between the summit of the grating, materialized by the center of the shaft-pin 12, and the middle of the roller. The roller is applied on one of the generating lines of the cylinder of horizontal pin 27, perpendicular to the displacement of the tappet, the contact between the roller and this cylinder being ensured by a return spring 28, acting on the arm 23. Under these conditions, the displacement of roller 26 on one of the generating lines of cylinder 27, of which the translation is assured by tappet 24, imparts a rotation $\gamma$ to arm 23, which permits the wavelengths to move along the exit slit. In addition, one may measure in this way, with good accuracy, the wavelength $\lambda$ which is expressed by:

$$\lambda = 2/KN \cos \theta_p \sin \gamma \tag{33}$$

According to this equation 33, the wavelength λ is a linear function of time only if the value of sin γ (t) can itself be obtained, in particular by the measurement of displacement D of a tappet component, which displacement may be easily rendered proportional to time if the speed of the motor connected to the tappet is constant ($D = vt$). It can be seen in FIG. 9b', that (for one rotation of arm 23) the displacement $D = C_oC' = C'_oC$ of cylinder 27 in the direction perpendicular to arm 23 has the value:

$$D = H_oH = 1 \sin \gamma (t) = vt \quad (34)$$

if $1 = OH_o = OH$. The equation 33 can therefore by written:

$$\lambda (t) = 2/KN \cos \theta_p \, vt/1 = Et \quad (35)$$

where E may be an integer (obtained by a suitable choice of the value of 1), which facilitates recording processing. In the case of the grating at 1,221.2 RPM, working in the first order ($K = 1$), if it is desired to cover 10 A in 1 minute and if the speed $v$ of displacement of tappet 24 has the value of 1/5 mm. per minute, the value of l, deduced from equation 35, is 317,807 mm.

It may be seen therefore that the mechanism described, despite its simplicity, permits to use the grating rotation to obtain a quite accurate measurement of the wavelength value, accuracy on the order of a few tens angstroms may be easily obtained.

It is well now to give some indications on the results obtained respectively with single and double monochromators, equipped with the mechanisms described beforehand and with entrance and exit slits of fixed widths.

SINGLE MONOCHROMATORS

FIGS. 10a and 10b show, for both cases in question (table 1), on the one hand the value of $f'_i$ in function of wavelength and, on the other, the values of theoretical resolution $<\delta\lambda>$ and of practical resolution $\delta\lambda_p$.

For the 500 mm. grating (FIG. 10b), working with 2 $\theta = 28°$, the deviation between $<\delta\lambda>$ and $\delta\lambda_p$ is negligible for the slit heights in question, although the opening is high.

In the case of the 400.7 mm. grating (FIG. 10a) although the deviation between $<\delta\lambda>$ and $\delta\lambda_p$ is larger (δ 0.5A) the latter represents only about one tenth of the limiting resolution, the mounting so realized being open to $f/4$ . . . This opening is very high for the spectral range in question in comparison to that of the present commercial instruments, where it equals $f/75$. It may be seen therefore that it is possible to produce single monochromators for which:

The incident and diffracted beams are fixed.

The entrance and exit slits are fixed both in position and in width.

The grating is imparted a rotation motion by a mechanism measuring the wavelength simultaneously.

For a rotation γ of the grating, one obtains, at the exit slit of width $f'_i$, passbands $\delta\lambda_p$ the length of which depends on $f'_i$ and the maximum intensity of which is located in the direction $\beta + \Delta \beta$ so that:

$$C_1 = \Delta\beta \cos \beta = - (C_{03} + \frac{C_{21}}{3} \rho^2) \frac{W_o^2}{4} = K N \Delta\lambda$$

which corresponds to the wavelength K (λ + Δλ).

In practice, in mountings with low dispersion, Δλ is not observable and, according to equation 33, what is observed then, for a given rotation γ of the grating, are the wavelengths λ , λ/2 , λ/3 in the sequence 1, 2 and 3. Therefore, there is order for superimposition at the exit slit level. This well-known phenomenon may be eliminated either by addition of filters or by a mounting providing a prefiltering, i.e. by means of double monochromators in particular.

Double Monochromators

Figure 8A:
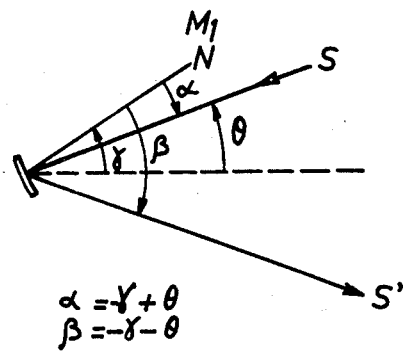
Figure 8B:
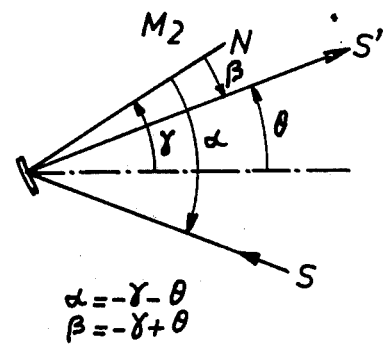
Figure 8C:
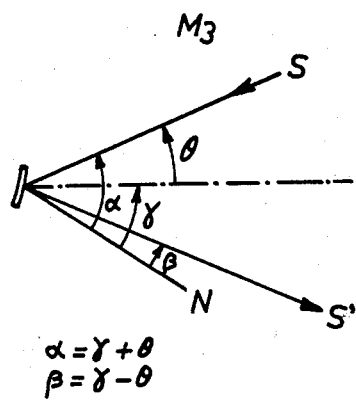
Figure 8D:
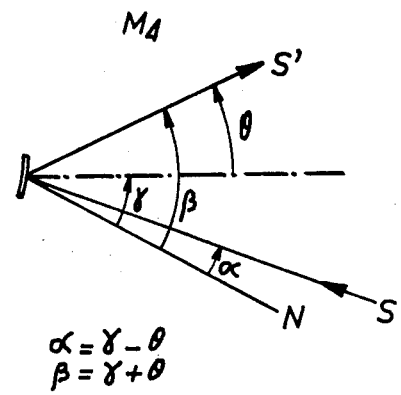

Like in the ultraviolet range, only a limited number of filters is available and, to separate the orders, it is necessary to produce double monochromators, the exit slit $S_1$ of the first mounting playing the part of the entrance slit of the second. This shows clearly the interest presented for the angle monochromators by such a mounting, the intermediate slit $S'_1$ being fixed both in position and in width. One may then produce mountings in "Z" (FIG. 11) by associating a mounting $M_1$ (FIG. 8a) with a mounting $M_3$ (FIG. 8c) or by associating a mounting $M_2$ (FIG. 8b) with a mounting $M_4$ (FIG. 8d).

The process according to the invention therefore permits the construction of double monochromators separating the orders and increasing the spectral purity, while working at very high brightness and high resolution and with an angle 2 θ between the two beams considerably less than 70°, which eliminates large intensity losses through astigmatism and polarization.

I claim:

1. In a spectrometric system including a first fixed member defining an entrance slit of finite area, a second fixed member defining an exit slit of finite area, a concave reflective diffraction grating having a selected radius of curvature, the center of said entrance slit presenting an entrance aperture which with the center of said grating defines an optical axis for incident radiation and the center of said exit slit presenting an exit aperture which with the center of said grating defines an optical axis for diffracted radiation, and means for rotating said grating about a fixed axis perpendicular to and passing through the intersection of said optical axes whereby successively to focus different wave lengths of incident radiation at said exit slit, the improvement wherein:

said first member is located a distance r from said center of the grating and said second member is located a distance r' from said center of the grating such that $r > m$ and $r' > n$ where m and n are those distances at which the first and second members would be located to produce a zero sum of the object and image tangential focus for a system having its entrance slit, and consequently its entrance aperture, of negligible area the differences $r - m$ and $r' - n$ being such as to displace the Gaussian reference sphere of the system by an amount sufficient substantially to compensate for those aberrations introduced by said finite, non-negligible area of said entrance slit.

2. In a spectrometric system according to claim 1 wherein optical axes include an angle 2θ which is equal to the difference between the angles of incidence and diffraction.

3. In a spectrometric system including a concave reflective diffraction grating having a given radius of curvature, a given number of lines per mm and a given ruled area, and rotating about an axis tangent to its summit, and including a fixed entrance slit, the center of said entrance slit defining an entrance aperture and optical axis for incident radiation with the center of said grating, and including a fixed exit slit, the center of said exit slit defining an exit aperture and an optical axis for diffracted radiation with the center of said grating, and means for rotating said grating about a fixed axis perpendicular to and passing through the intersection of said optical axes whereby successively to focus different wavelength at said exit slit, the improvement wherein:

said entrance slit is located at a distance $r$ from said center of the grating, said exit slit is located to a distance $r'$ from said center of the grating, said optical axes include a fixed angle $2\theta$, said distance $r$ and $r'$ being equal to values determined for a mounting having a null aperture (i.e. values obtained by considering that the sum of the object and image tangential focus is null) said values being increased by an amount essentially equal to that required to achieve a displacement of the gaussian reference sphere in order to compensate the aberrations given by the concave grating in the considered amount, the value of said amount being then determined in function of said aberrations by image quality criterion.

4. A spectrometric system according to claim 3, characterized in that to each value of $2\theta$ and for each value of the couple W and L, is associated a value of $\epsilon$ such that $T + T' = \epsilon$ and further that, to any value $f'$ of the exit slit is associated a practical resolving power $$R_p = \frac{r' N K \lambda}{f' \cos \beta}, \text{ where } \frac{\lambda}{R_p} \geq \delta\lambda_{inst}, \text{ where}$$

where

W and L respectively are the width and length of the ruled area of the grating, where $T$ and $T'$ respectively are the object tangential focal length and the image tangential focal length and $\epsilon$ represents second order aberrations introduced by said grating in imaging said entrance slit at said slit, $f'$ is the width of the exit slit, N is the number of ruled lines per mm of the grating, $\lambda$ is wavelength, $\beta$ is the angle of diffraction and $\delta \lambda$ inst. is defect of residual instrument setting.

5. A spectrometric system according to claim 1, characterized in that the rotation grating is associated with several exit slits.

6. A spectrometric system according to claim 1, characterized in that the image plane is chosen by taking into account not only the aberrations of the concave grating used but also aberrations resulting from the lighting conditions of said grating.

7. A spectrometric system according to claim 1, characterized in that the middles of the entrance and exit slits are in a plane containing the line normal to the grating and perpendicular to the direction of the grating lines and in that the entrance and exit slits have a fixed width, i.e. are independent of the wavelength $\lambda$ determined so that there is no flux loss at the exit slit level.

8. A spectrometric system according to claim 2 characterized in that the value of angle $\theta$ of each grating is determined so that, for a given grating and for the object and image distances satisfying the relation $T + T' = \epsilon$ where T and T' respectively are the object tangential focal length and the image tangential focal length and $\epsilon$ represents second order aberrations introduced by said grating in imaging said entrance slit at said exit slit, the value of the width $f'_1$ of the exit slit, necessary to pick up all the flux corresponding to the practical resolution.

9. A spectrometric system according to claim 8, characterized in that two mountings with single grating rotation are associated in a "Z" mounting, the exit slit of the first serving as the entrance slit for the second mounting, and in that the first grating rotates in the direction of the entrance slit and the second rotates in the opposite direction (direction of the exit slit of the second mounting).

10. A focalization method for concave, reflective diffraction gratings having a curvature R wherein the dispersion and focus of different wavelengths of incident radiation are obtained with fixed entrance and exit slits and solely by rotation of the grating about a fixed axis, which comprises the steps of:

a. relatively locating the entrance slit, the exit slit and the grating in fixed relation to define axes of incidence and diffraction lying in a plane perpendicular to the axis of rotation of the grating and passing through the center of the grating perpendicular to the rulings thereof;

b. locating said axes of incidence and diffraction such that they include an angle $2\theta$ equal to the difference between the angle of incidence $\alpha$ and the angle of diffraction $\beta$ ; and c. locating said entrance and exit slits at distances from the grating respectively equal to $r$ and $r'$ such that:

$$\frac{\cos^2 \alpha}{r} + \frac{\cos^2 \beta}{r'} - \frac{\cos \alpha + \cos \beta}{R} = \epsilon$$

where $\epsilon$ is defect of focus balancing aberration terms of the second order providing a limited resolving power $R_p = 0.8 \, K \, N \, W_o$ where K is the order of diffraction, N is the number of rulings per mm, and $W_o$ is the optimum ruled width of the grating computed on the basis of Strehl's criterion.

11. A focalization method for concave, reflective diffraction gratings having a radius of curvature R wherein the dispersion and focus of different wavelengths of incident radiation are obtained with fixed entrance and exit slits and solely by rotation of the grating about a fixed axis, which comprises the steps of:

a. relatively locating the entrance slit, the exit slit and the grating in fixed relation to define axes of incidence and diffraction lying in a plane perpendicular to the axis of rotation of the grating and passing through the center of the grating perpendicular to the rulings thereof;

b. locating said axes of incidence and diffraction such that they include an angle $2\theta$ equal to the difference between the angle of incidence $\alpha$ and the angle of diffraction $\beta$ ; and c. locating said entrance and exit slits at distances from the grating respectively equal to $r$ and $r'$ such that:

$$\frac{\cos^2 \alpha}{r} + \frac{\cos^2 \beta}{r'} - \frac{\cos \alpha + \cos \beta}{R} = \epsilon$$

where $\epsilon$ is a defect of focus balancing aberration terms of the second order providing a limiting resolution $< \delta \lambda >$ and a corresponding limited practical resolving power $$R_p = \frac{\lambda}{<\delta\lambda>}.$$

12. The method according to claim 10 wherein the width $f$ of the entrance slit has the value $$f = \frac{r\lambda}{\cos\alpha\, 0.8 W_o}$$

and the width $f'$ of the exit slit has the value $$f' = \frac{r'\lambda}{\cos\beta\, 0.8 W_o}.$$

13. The method according to claim 11 wherein the width $f$ of the entrance slit has a value $$f = \frac{r K N <\delta\lambda>}{\cos\alpha}$$

and the width $f'$ of the exit slit has a value $$f' = \frac{r' K N <\delta\lambda>}{\cos\beta}.$$

14. In a spectrometric system including a first fixed member defining an entrance slit of finite area, a second fixed member defining an exit slit of finite area, a concave reflective diffraction grating having a selected radius of curvature, the center of said entrance slit presenting an entrance aperture which with the center of said grating defines an optical axis for incident radiation and the center of said exit slit presenting an exit aperture which with the center of said grating defines an optical axis for diffracted radiation, and means for rotating said grating about a fixed axis perpendicular to and passing through the intersection of said optical axes whereby successively to focus different wave lengths of incident radiation at said exit slit, the improvement wherein:
said first member is located a fixed distance $r$ from said center of the grating and said second member is located at distance $r'$ from said center of the grating, and said distances $r$ and $r'$ being such as to satisfy the fundamental focalization equation:

$$T + T' = \epsilon$$

where $T$ and $T'$ respectively are the object tangential focal length and the image tangential focal length and $\epsilon$ represents a defect of focus balancing second order aberrations introduced by said grating in imaging said entrance slit at said exit slit.

15. In a spectrometric system as defined in claim 14 wherein the width of said entrance slit equals $$r K N \frac{<\delta\lambda>}{\cos\alpha}$$

and the width of said exit slit equals $$\frac{r' K N <\delta\lambda>}{\cos\beta}$$

where K is the order of diffraction, N is the number of grating lines per mm, $<\delta\lambda>$ is the limiting resolution, $R_p$ is practical resolving power equal to $0.8\, K\, N\, W_o$ where $W_o$ is the width of the ruled area of the grating, and $\alpha$ and $\beta$ respectively are the angles of incidence and diffraction.

16. In a spectrometric system as defined in claim 14 wherein the width of said entrance slit equals $$\frac{r\lambda}{\cos\alpha\, 0.8 W_o}$$

and the width of said exit slit equals $$\frac{r'\lambda}{\cos\beta\, 0.8 W_o},$$

where $\alpha$ is wavelength, $W_o$ is the width of the ruled area of the grating, and $\alpha$ and $\beta$ respectively are the angles of incidence and diffraction.

* * * * *